US005548705A

United States Patent [19]

Moran et al.

[11] Patent Number: 5,548,705
[45] Date of Patent: *Aug. 20, 1996

[54] WIPING METAPHOR AS A USER INTERFACE FOR OPERATING ON GRAPHICAL OBJECTS ON AN INTERACTIVE GRAPHICAL DISPLAY

[75] Inventors: Thomas P. Moran, Palo Alto, Calif.; Elin R. Pedersen, Copenhagen, Denmark; Michael K. McCall, Menlo Park; Frank G. Halasz, Santa Cruz, both of Calif.

[73] Assignee: Xerox Corporation, Stamford, Conn.

[*] Notice: The term of this patent shall not extend beyond the expiration date of Pat. No. 5,404,439.

[21] Appl. No.: 394,919

[22] Filed: Feb. 27, 1995

Related U.S. Application Data

[63] Continuation of Ser. No. 869,554, Apr. 15, 1992, abandoned.

[51] Int. Cl.[6] .................................................... G06T 11/80
[52] U.S. Cl. .......................................... 395/159; 395/133
[58] Field of Search ..................................... 395/155–161, 395/133; 345/145, 156

[56] References Cited

U.S. PATENT DOCUMENTS

| | | | |
|---|---|---|---|
| 4,633,436 | 12/1986 | Flurry ........................................ | 345/179 |
| 4,683,468 | 7/1987 | Himelstein et al. ................ | 345/145 X |
| 4,686,522 | 8/1987 | Hernandez et al. ..................... | 345/160 |
| 4,698,625 | 10/1987 | McCaskill et al. .................. | 345/145 X |
| 4,785,399 | 11/1988 | Evans et al. ............................ | 395/156 |
| 4,809,201 | 2/1989 | Keklak .................................... | 395/155 X |
| 4,815,029 | 3/1989 | Barker et al. ......................... | 395/156 X |
| 4,823,285 | 4/1989 | Blancato .................................. | 395/135 |
| 4,847,605 | 7/1989 | Callahan et al. ........................ | 345/145 |
| 4,952,932 | 8/1990 | Sugino et al. .............................. | 341/23 |
| 4,984,152 | 1/1991 | Muller ..................................... | 395/153 |
| 5,021,976 | 6/1991 | Wexelblat et al. .................. | 395/159 X |
| 5,027,291 | 6/1991 | Callahon et al. ....................... | 395/133 |
| 5,063,600 | 11/1991 | Norwood ............................. | 345/145 X |
| 5,072,412 | 12/1991 | Henderson, Jr. et al. ............... | 395/159 |
| 5,129,083 | 7/1992 | Cutler et al. ............................. | 395/600 |
| 5,151,686 | 9/1992 | Freeman ............................... | 345/156 X |
| 5,157,384 | 10/1992 | Greanias et al. ........................ | 345/156 |
| 5,159,664 | 10/1992 | Yamamoto et al. ..................... | 395/133 |
| 5,208,909 | 5/1993 | Corona et al. .......................... | 395/155 |
| 5,211,564 | 5/1993 | Martinez et al. ................... | 395/159 X |
| 5,231,698 | 7/1993 | Forcier ................................ | 395/155 X |
| 5,241,624 | 8/1993 | Torres .................................. | 395/155 X |
| 5,250,929 | 10/1993 | Hoffman et al. ........................ | 345/146 |
| 5,252,951 | 10/1993 | Tannenbaum et al. ................. | 395/156 |
| 5,299,307 | 3/1994 | Young ..................................... | 395/161 |
| 5,307,452 | 4/1994 | Hahn et al. .............................. | 395/132 |
| 5,371,845 | 12/1994 | Newell et al. .......................... | 395/155 |
| 5,404,439 | 4/1995 | Maran et al. ........................... | 395/155 |

OTHER PUBLICATIONS

Jensen et al. Harvard Graphics the Complete Reference, 1990, pp. 24–27, 48–49, 206–207, 271–330, 555, 602–605, 1000.
Cobb, Running Microsoft Excel, 1991 pp. 442–465.
Microsoft, Windows 3.0 Use Manual, 1990, pp. 263–303.
Borland, Quattro Pro User's Guide, 1989, pp. 111 to 169.

(List continued on next page.)

*Primary Examiner*—Mark K. Zimmerman
*Assistant Examiner*—Anton W. Fetting
*Attorney, Agent, or Firm*—Rosen, Dainow & Jacobs Limited Liability Partnership

[57] ABSTRACT

A computer-controlled graphics display system using object-based representations of the displayed objects, and cooperating with a user-operated motion-sensitive input device. A powerful user interface technique called "wiping" is described. This allows selection by the user of target objects to be acted on by accessing an applicator and sweeping the applicator over the display. Selected objects are determined by selection criteria including spatial intersection of the applicator sweep stroke with the displayed object, and time of object creation. The effect on the selected objects is on the entire object and is determined by an operator associated by the user with the applicator, such as object grouping, deletion, coloring, uncoloring, thickening, or object size relocation.

27 Claims, 6 Drawing Sheets

OTHER PUBLICATIONS

J. Maeda and B. Sabiston, "The Enhanced Paint Metaphor of Aninemo", Research Institute for Media Sciences, Tokyo, Japan, The MIT Media Laboratory, Cambridge, MA, 2 Page Handout.

Direct WYSIWYG Painting and Texturing on 3D Shapes, Pat Hanrahan and Paul Haeberli, Computer Graphics, vol. 24, No. 4, Aug. 1990, pp. 215–223.

IBM Technical Disclosure Bulletin, vol. 30, No. 9, Feb. 1988, New York, US, pp. 348–350, XP 000038237 "Object-Picking Method by Hierarchical Hand–Marking".

Proceedings of the ACM Symposium on User Interface Software and Technology, 11 Nov. 1991 USA, pp. 137–144, XP 00315074, gordon et al. "Issues in Combining Marking and Direct Manipulation Techniques".

WIPING METAPHOR AS A USER INTERFACE FOR OPERATING ON GRAPHICAL OBJECTS ON AN INTERACTIVE GRAPHICAL DISPLAY

This application is a continuation of application No. 07/869,554, filed Apr. 15, 1992, now abandoned.

RELATED APPLICATION

Concurrently filed, commonly assigned, U.S. application Ser. No. 07/869,559, now U.S. Pat. No. 5,404,439, entitled "Time-Space Object Containment For Graphical User Interface."

BACKGROUND OF INVENTION

This invention relates to computer,controlled graphical drawing and editing systems and methods, and in particular to such drawing and editing systems based on object-oriented display representations.

Graphical drawing and editing systems are generally of two kinds: painting programs and structured drawing programs. Painting programs allow the user to paint lines (or "spray" patterns) and erase on an image-based representation, usually a two-dimensional array of pixels. Structured drawing programs allow the user to create, modify, and delete geometrically-defined objects. An object-based representation, as distinguished from an image representation, has many advantages for computation, but the user interface to such a representation has typically used more discrete actions, which are more awkward for the user. Especially for computer systems with pen (or stylus) input devices for various size displays, from notebook-sized to whiteboard-sized displays, the problem has been troublesome. While many drawing systems allow drawing and, for example, erasing of images with pen-based motions, it is accomplished on a pixel by pixel basis of the pixel-array image representation. Where object-based representations are used, erasing has been done by discrete actions, such as drawing a loop around some objects and then evoking a delete operation.

The problem is much worse for large scale interactive displays for supporting group meetings and presentations. An example is the Liveboard, described in a paper to be published in Proceedings of CHI,92, the ACM Conference on Human Factors in Computing Systems, May 3–7, 1992 Monterey, Calif. The latter employs a bitmap painting program which requires pixel-map based representations for the display. This is very limiting with respect to the flexibility in dealing with objects.

SUMMARY OF INVENTION

An object of the invention is a method for dynamically selecting and operating on objects displayed on a screen using an input device.

A further object of the invention is a display system employing an input device for creating and modifying object-based representations.

Another object of the invention is a display system with a continuous-motion-sensitive input device that can utilize natural hand and arm motions to operate on an object or objects in one motion.

A further object of the invention is a novel interface technique between a user and a display system employing object-based representations and which can be characterized as powerful-because it allows a variety of rapid and dynamic display selections and operations-yet is natural-because the selections and operations involve familiar user actions.

The invention is concerned with display systems using object-based representations, and having an input device for selecting and operating on objects displayed on the system display screen.

In accordance with one aspect of the invention, under user control, an applicator is provided. The applicator is an object under the control of the user. The applicator position, if displayed on the screen, follows the user's motion with, for example, a pen or mouse as an input device. If the pen, for example, is swept over the display surface, a two-dimensional (2-D) applicator object is swept along the path described by the pen. The action is similar to moving a cloth or sponge for wiping a surface of a whiteboard, so that it is a natural wiping motion for the user. The effect on the display from this wiping action depends upon the nature of an operator associated by the user with the applicator, and user-determined criteria as to which displayed objects will be selected and operated on.

In accordance with another aspect of the invention, the applicator can have associated with it one of a plurality of operators capable of influencing the displayed objects. Many different kinds of operators can be employed, such as, for example, grouping, deleting, cutting, copying, selecting, coloring, positioning, or undoing. This ability to associate with the same natural pen-like wiping action a plurality of different object-influencing actions enhances the power and consistency of the inventive technique.

In accordance with still another aspect of the invention, the objects influenced by the wiping action can be user-determined with, preferably, default criteria active in the absence of a user command. The criteria used can cover a large variety of circumstances. For example, all objects intersected by the 2-D wiping motion can be selected, or only those that satisfy an intersection minimum or threshold. The criteria used can also include for selection all objects within a certain distance of the wiping motion, or all objects created within a certain time interval of one another or objects filtered by an arbitrary predicate.

While current painting programs allow some wipe-like actions (i.e., painting), they do so over image-based representations. The invention here applies the wiping technique to object-based representations and, by doing so, generalizes the range of operators that can be applied by wiping. Thus the distinction between image-based and object-based representations is important to the invention.

An object-based representation is composed of a collection of independently-described objects. An "object" represents a semantic aspect of an application domain (e.g., letters, words, and paragraphs in a word processor; strokes in a drawing system; temporal events and dependencies in a project management system; etc.). Each object is represented in a data structure that describes a set of properties of the object. The properties can represent not only positional and visual attributes, but also abstract attributes and application-specific attributes. Each object is uniquely addressable by a pointer or identifier, and thus objects can refer to each other in their descriptions. There can also be objects which describe relations or constraints between objects. Objects thus described have some useful characteristics. For example:

1. An object can be arbitrarily distributed in space.
2. Objects can overlap spatially with each other.
3. An object can be moved to a new position in space.

4. An object can be deleted from the representation.

5. New objects can be added to the representation at any spatial location.

6. An object can have both its physical and abstract properties changed by arbitrary computations.

All the objects need only be aggregated as a simple list, since the objects themselves fully describe how they go together spatially. Object-based representations are rendered into either procedural representations (such as PostScript) or image-based representations (such as a pixel array) in order to guide the display hardware and software to display the objects on the screen. Inputs, in terms of the screen coordinates, can be mapped back to specific objects in order to allow the user to manipulate the object-based representation. Any resulting changes to the objects are then re-rendered into a new display.

An image-based representation consists of a compact (i.e., space filling) cellular spatial structure, usually (but not confined to) a two-dimensional array of rectangular cells. Each cell, called a "pixel," represents a small, unique spatial region of the image. Pixels only describe the visual characteristics of their region (although it is possible to store other properties in the data structure of the pixel). Image representations often consist of layers, each layer being a separate array, and the image composed by combining respective pixels in the different layers. It might seem that pixels are similar to objects, but pixels cannot satisfy the six characteristics listed above for objects.

Image-based representations can be directly displayed; and they can be manipulated in response to inputs from the user in terms of screen coordinates. However, the operations on the image-based representation are limited to being "local" to the inputs, in the sense that they affect pixels in the neighborhood of the inputs and can propagate the effects to the spatial neighboring pixels. For example, a "spray" operation changes pixel colors within some distance of the spray input points; a "bleed" operation changes colors at the input points and then applies the color changes, with reduced intensity, to neighboring pixels, and continues to do this until the color changes are nil; a "fill" operation changes pixel colors at the input point and propagates the changes to neighboring pixels iteratively until some "boundary color-"(say, black) is encountered.

It is possible to start with an image-based representation and to apply "recognition" operations to the representation in order to identify sets of pixels as representing objects. If this is done and data structures created to represent these recognized objects, then this is considered to be an object based representation.

The present invention will be better understood from the detailed description given herein below in conjunction with the accompanying drawings, which give by way of illustration only and not by limitation, preferred embodiments in accordance with the present invention.

DETAILED DESCRIPTION OF PREFERRED EMBODIMENTS

Figure 1:
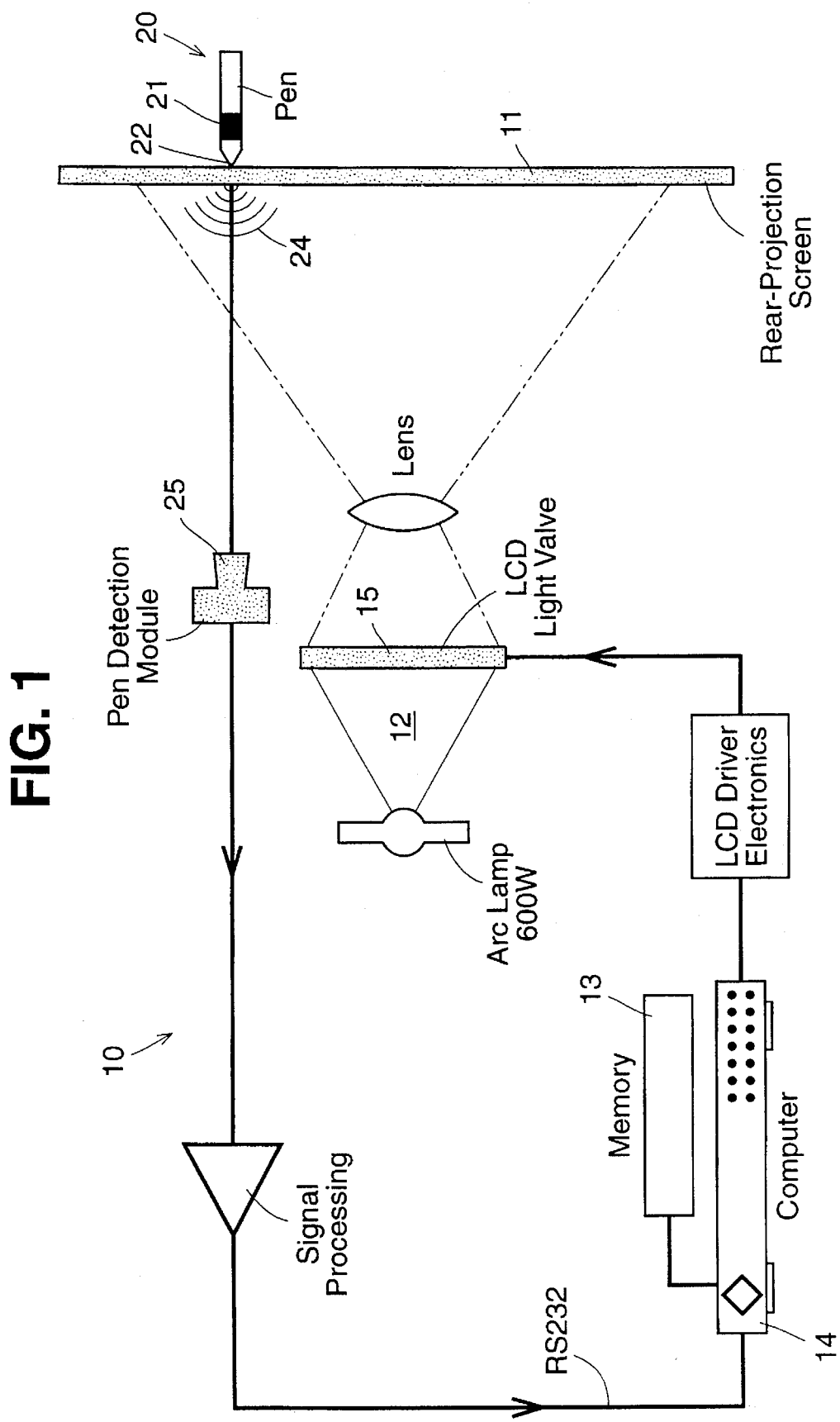
FIG. 1 is a block diagram illustrating one form of computer-controlled whiteboard in which the invention can be employed.

FIG. 1 schematically illustrates a whiteboard 10 of the type described in the referenced Liveboard paper with which the invention is particularly useful. Details of the whiteboard are not given as not essential to the invention. Suffice to say, the system illustrated comprises a display screen 11 with means 12 for projecting or displaying on the screen objects determined by and under control of a computer 14. In the Liveboard, the projection means simulates a TV projection system using a liquid crystal device 15 which creates the objects then projected onto and displayed on the screen 11. Associated with the system is a pen-like or similar drawing device 20, preferably cordless, and provided with means for controlling the beginning and ending of any pen motions. For example, as with digitizers or mouses, the pen can have buttons 21 which when clicked or released signals an action is to be taken. In addition, the pen can have a pressure-sensitive tip switch 22 which when pressed against the screen recognized by the whiteboard as beginning or ending a pen action signals an action is to be taken. The means for conveying these pen signals or commands to the whiteboard can be the same as those employed in digitizer tablets. As explained later, wiping is guided by a continuous, motion-sensitive input device, so that it is a natural wiping motion for the user. By a "continuous, motion-sensitive input device" we mean any input device that can be moved over the display surface (like a stylus) or moved over a surface that is electronically mapped onto a cursor on the display (such as a pen and tablet or a mouse). We refer to any such device here for simplicity as a pen.

The whiteboard 10 must be able to recognize the position of the pen 20 on the screen 11, specifically its X-Y coordinates. This can be accomplished by mounting digitizer grids (not shown) behind the screen, and equipping the pen with electromagnetic, electrostatic or other means for cooperating with the digitizer grids to locate the pen position.

Alternatively, as in a touch screen, the pen can be equipped with means for generating a beam 24 of optical radiation which is imaged onto a detector module 25 located behind the screen. With this embodiment, which is preferred, the pen 20 need not be in contact with the display screen, but the user can provide input at some distance from the screen for remote pointing and gestural input. For further details on the construction and operation of such a system, the Liveboard paper referenced should be consulted.

As mentioned, the system includes a computer 14 with appropriate memory 13 for calculating or otherwise determining the location of the pen when signaled by the user, and is also capable of creating and storing under control of the user representations that can be displayed on the screen, in a way that is similar to that used by known graphical drawing and editing systems, such as Paintbrush or Macpaint. However, in the system of the invention, each of the representations are object-based, as distinguished from an image-based representation. The ways of doing this are described at length in published literature on object-oriented design. As one example, which will help in understanding how the wiping motions can interact with a displayed object, an object instance can be viewed as a data structure, for example, a C struct or Pascal record, with object properties or attributes recorded in fields of the data structure that can include the coordinates of its screen position, its color, the thickness of lines defining the object, object fill patterns, the time of its creation, and so forth. As an example, a typical data structure for a stroke object is shown below. In this example, a C++ class is illustrated. The object is described by a data structure and a set of operations on that data:

A stroke object may be described by the following data:

| | |
|---|---|
| pageN | the page of the document that the stroke is located on |
| pageX | the X and Y coordinates of the origin point of the stroke |
| pageY | on the document page |
| pageL | the layer of the page on which the stroke is located |
| Nsegments | number of segments in the path of the stroke ("segments" is explained below) |
| path: $dx_1, dy_1$ | a list of dx, dy pairs describing the length and direction of |
| $dx_2, dy_2$ | each segment of the path that defines the shape of the stroke |
| $dx_3, dy_3$ | |
| $dx_4, dy_4$ | |
| etc. | |
| color | a 3-component color code |
| transparency | of the color |
| thickness | of the stroke line |
| line style | style of line (e.g., dashed) |
| bounding box | the coordinates of the top, bottom, left, and right of the minimal rectangle enclosing the stroke (this is computed from the origin point, the path, and the thickness) |
| creation time | clock time at creation |
| last mod time | clock time of latest modification |
| groups | list of groups in which this stroke is included |
| tags | list of arbitrary tags attached to this stroke |
| property list | list of arbitrary attribute-value pairs |

Other kinds of objects would have some of the same fields as a stroke object as well as other fields unique to the object. As is well-known, object-oriented languages encapsulate the data representing the object with the methods required to display it or them. Display is achieved by the operating system sending a message to the object to display itself on the screen. Routines are available in C++ libraries for carrying out these functions of printing or displaying an object on the screen as well as other common functions.

Selection of objects can be made through use of any of its attributes. For simplicity, we will describe a preferred arrangement in which the object's X-Y coordinates are employed as the selection criteria. One simple way of accomplishing the foregoing is to associate with the data structure representing each displayed object, or compute from its location coordinates in a known manner, a bounding box whose X-Y coordinates are stored in the object's data structure in memory.

Figure 2:
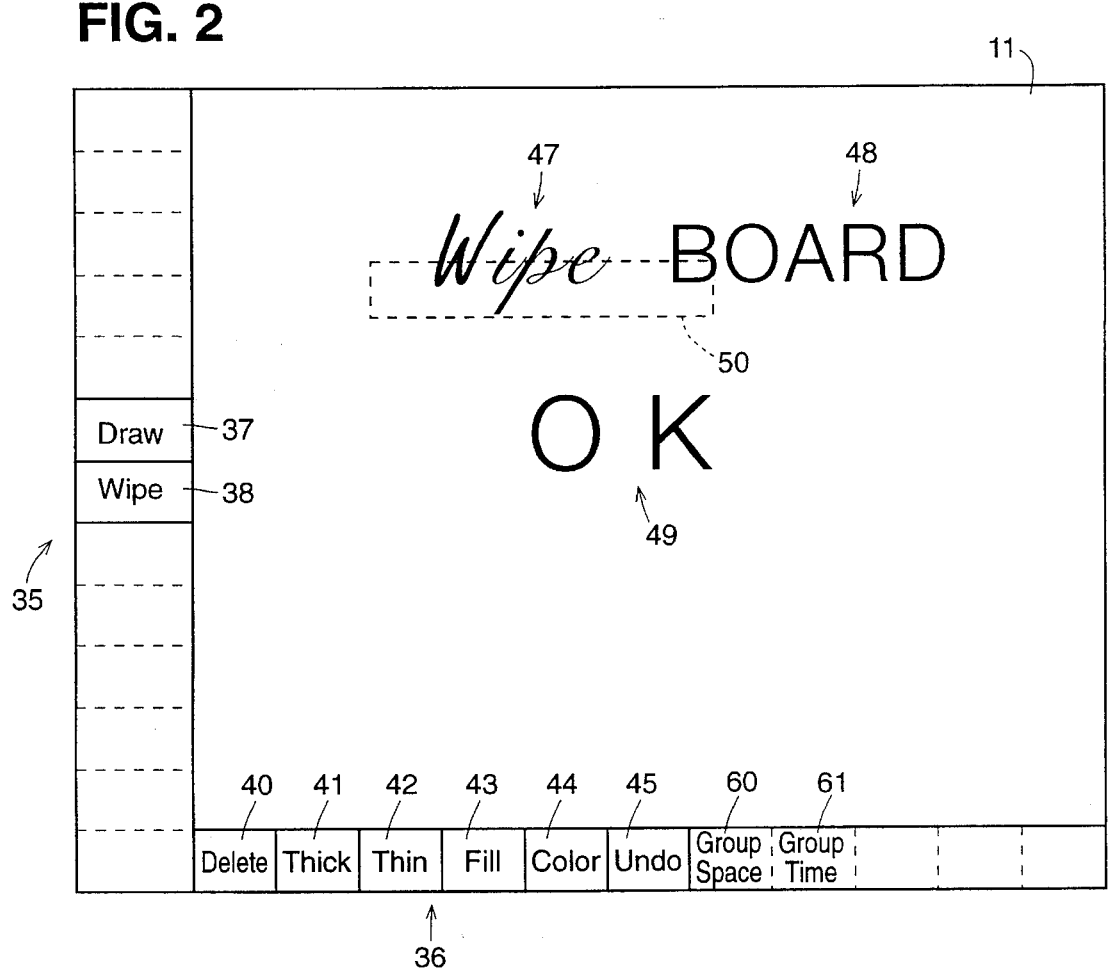
FIG. 2 is an elevational view of a screen display with software-controlled select buttons or icons displayed alone two screen edges, and with several objects on display.

We will assume in the description that follows that the user has created one or more objects that are displayed on the screen. As with the referenced graphics drawing programs, it is preferred for the display screen to display along its edges a series of buttons or icons that can be employed by the user to generate events for activating the software to implement user desires. FIG. 2 illustrates an example of one simple screen display with a set of buttons or icons for implementing the invention. The buttons/icom along the left screen edge 35 establish pen functions, and those 36 along the bottom screen edge determine the wiping operator. In the example illustrated, the pen functions are DRAW, WIPE, and others, not shown, associated, respectively, with buttons 37 and 38. The buttons wiping operators shown, as an example only, are DELETE 40, THICKEN 41, THIN 42, FILL 43, COLOR 44, and UNDO 45. As is well known, when the user places the pen over or near a particular button or icon, and activates a pen switch or button, the computer can determine from the pen's location the function or operator chosen by the user.

FIG. 2 also shows on the screen several objects 47, 48, 49 created by drawing by the user after activating the draw button and a desired set width button (not shown). The objects displayed can each consist of a single drawing stroke by the user while a pen switch is activated. Alternatively, when polygons, circles or other shapes are created, the entire shape can be treated as a single object.

The way wiping works as a user interface is illustrated by the following scenario: The user with his pen touches a button 38 and enters "wipe mode". The system provides an applicator. The user can then select the delete operator 40 to associate with the applicator, or by default, the applicator starts with a delete operator and thus is an eraser. The user erases a few objects by wiping, then touches the color button 44. A color spectrum (not shown) pops up and the user chooses the make-red button with the wiper. Wiping now turns objects red. After doing so to a few objects, the user notices that too many objects were turned red. The user "dips" the wiper into the Undo button 45, making Undo the operator. Then by wiping the objects that are not supposed to be turned red, they are returned to their original colors. Finally, the user exits from the wipe mode.

More formally, the components of wiping are as follows:

1. Applicator. The applicator as a data object has a shape and size which determines a path region. The path of the applicator, stored by the computer, is made up of a chain of straight line segments, the ends of which are the sensed locations of the pen. Thus the path region is made up of a chain of path region segments. For example, a rectangular cursor produces path region segments that are hexagonal (explained below). The applicator's shape and size is preferably definable by the user, that is, it can be varied to accomplish different tasks.

2. Selection criteria. The abstract function of wiping is to select or group objects to be operated upon. Basically, the objects whose area intersects the wipe path region are selected, simply implemented in software by testing the coordinates of the bounding box of each displayed object for intersection with those of the applicator's path region. However, there are other selection criteria that can be used for deciding whether an intersected object is actually selected. The simplest criterion is the intersection threshold, which measures the percentage of the object's area that is intersected by the wipe path region. The most liberal criterion is a non-zero intersection threshold, i.e., even the slightest touching of an object by the applicator causes it to be selected. A strict 100% threshold is usually not useful, but high, low, and majority (50%) thresholds have their uses. Note that the intersection threshold should be computed dynamically under these circumstances. A more rigorous description of how to determine selected objects by touching appears below. As a wipe proceeds, the wipe path grows and can intersect more and more of an object until it reaches threshold. For example, FIG. 2 illustrates in dashed lines wipe path region 50 formed by a user. Assuming the threshold was set at, say, 30 percent, the object 47 made up of one upper case character and separated group of three lower case characters would be selected. The initial upper case character of the next object 48 would also be selected. If the operator were DELETE, all three items would be erased. Since the erasure of the letter B was probably not intended, this is where the latter can be overridden by applying the UNDO operator to just the letter B.

There are other useful selection criteria, which are usually task-specific. Applicators are usually designed to be of a size and shape proportional to the kinds of objects that they are intended to select. For example, an applicator intended to select the strokes of handwritten words is sized to be somewhat less than the height of the words so that a wipe can be easily be made across the words. Given this intent, a useful selection criterion is to reject any stroke that is too large to be part of a word. Thus, when a stroke depicting a box surrounding the words is wiped, it is not selected. Note that this criterion is much easier to compute than dynamic intersection thresholds.

Another example is in the case where the displayed objects are organized into a set of two-dimensional layers. Here, a specialized criterion could be to filter which objects are selected by which layers they are on.

There are also time-based criteria that can be used for selection, which are described below.

3. Scoping wipe actions. There are four nested intervals of time that can be employed for defining the scope of wiping: the scope of the wipe session, the scope of the operator, the scope of the wipe stroke, and the scope of the stroke branch. (A) The largest scope is the wipe session. A wipe session consists of a series of wipe strokes and possible changes of operator. A wipe session is usually bounded by entering and leaving some sort of a wipe mode. (B) The wipe session is divided into one or more operator scopes. An operator scope is the duration of time during which the operator remains unchanged. The operator scope is made up of a series of wipe strokes. (C) Each wipe stroke is defined by the pen device touching down on the display surface (or pen button being pressed), sliding along the display surface, and then pulling up from the surface (or releasing the button). The duration of the wipe stroke defines the smallest scope. (D) Branch scope: A stroke that has sudden reversals in direction is divided into "branches" by the reversals. For example, a stroke with 2 reversals has 3 branches. The branch scope is the, time of a branch. In the above example, they are from the beginning of the stroke to the 1st reversal, from the first to the 2nd reversal, and from the 2nd reversal to the end of the stroke.

4. Grouping selected objects. These intervals can be used to define a natural grouping on the objects selected. The set of objects selected by a branch is called a branch group; the set of objects selected by a wipe stroke forms a wipe stroke group; the set of objects selected by an operator scope defines an operator group; and the set of objects selected in a wipe session constitutes a wipe session group.

5. Dynamics of application. The computation of selected objects preferably takes place dynamically. While the user wipes with the pen input device, wipe stroke segments are produced and objects are selected, for example, by storing pointers to the objects in a suitable list, as they meet the selection criteria. Usually, the operator is applied to the objects as they are selected. For example, if the operator is deletion, then objects are deleted as the user wipes, simulating the effect of a physical eraser. However, the application of the operator can be delayed. One pattern of delay is to hold the application until a wipe stroke is completed and then to apply the operator to the wipe stroke group; another pattern is to delay until the wipe session is ended and apply the operator to the whole wipe session group.

6. Feedback for the wipe. There can be auditory and/or visual feedback to the user during the course of wiping. Auditory feedback can be used to signal when a wipe stroke is being created, when objects are selected, or when the operator is applied. Visual feedback can make the wipe strokes visible (e.g., as a light transparent background, like a highlight marker pen produces), or the objects selected can be highlighted in various ways (e.g., by a distinctive color or a shadow). The duration of visual feedback is usually to the end of the wipe session.

7. Operators applied. Many different kinds of operators can be applied to the objects selected. Here are examples of some of them to give an idea of the versatility of this interface technique and the range of possibilities:

Deleting, Cutting, Copying. As already noted, deleting selected objects simulates physical erasing. Cutting can be used not only to delete objects, but also to save them in a "clipboard" buffer for later use (such as Pasting somewhere else). Copying saves selected objects without deleting them.

Selecting, Grouping, Tagging. Wiping can be used purely for selection. After a wipe session, the wipe session group is saved for later use by the system. Wiping can also be used to group objects into higher-level structures by using the wipe stroke groups. For example, if the objects are the strokes of handwritten characters, wipe strokes can be used to structure the handwriting into items of a list. The tagging operator can be used to apply a distinguishing tag to objects, and wiping can be used for tagging. For example, if the objects are the strokes of handwritten characters, wiping can be used to tag subsets of these strokes as representing, say, important ideas or action items.

Changing object properties. Many operators change the value of object properties, e.g., color, position, orientation, scale, thickness. These are straightforward wiping operators. For example, in a window system, wiping could be used to apply a shrink operator that causes windows to go from full size to icon size.

Relative change operators. Some operators cause relative changes to objects, e.g., to make the color a bit darker, to move them up a bit, to rotate them a bit, to thicken them a bit. What distinguishes relative operators is that they can be applied iteratively to effect greater and greater change. Applying these operators by wiping raises the issue of how many times to apply them. Since a natural wiping motion is to wipe back and forth, an object may be selected more than once in the same wipe stroke. For an absolute operator, this is not a problem, since iterative application is redundant. One solution is only to allow a single application of the operator within the scope of wipe stroke or a branch of a stroke or a wipe session. A preferred solution is to repeat the operator in each branch of the stroke.

Undoing. The general undo operator may also be applied to wiping. For example, suppose a make-red operator was attached to the applicator and the user wiped over several objects with it, but the user noticed that some objects were turned red that shouldn't have been. To fix this, the undo operator can be attached to the applicator and the objects incorrectly turned red are wiped, turning them back to their original color. Another example: Suppose the operator is delete, and some objects are erased by mistake. It is difficult to wipe with undo because the objects are gone. However, if the wipe path has been made visible, then this gives an indication where the deleted objects were located, and wiping these locations with undo brings them back.

The general user interface technique of wiping is thus defined by the combination of different values for these components. For a given application program, the application programmer can define a range of values for the components to produce a wiping user interface for the application. These choices must be built on an architecture or control structure that implements the dynamics and integrates them into the rest of the application program's user interface.

Once a range of component values is provided, they must be made available to the user. One simple, standard technique for this would be to provide a "wiper icon" for the applicator with a property sheet as part of a set-up operation for the session that the user can use to define the applicator. The user can open the wiper's property sheet and set values for, say, the following components:

applicator selection criteria operator application dynamics grouping feedback where each component provides a menu of allowed values. For example, the user could set the wiper to have a large applicator that selects only annotation objects and moves them to a "comments list," where the objects are grouped by wipe strokes, and the dynamics are to make the move only after each wipe stroke, and the feedback is to make the annotation objects red as they are selected.

This property sheet technique may be more general than is needed in most applications. At minimum, the user should be able to select the operator (or else it is not generalized wiping), and once selected, all other components can be set by the program with appropriate values. Thus all the user has to do is to select the operator, and this can be made easy to do. The most obvious way, as shown in FIG. 2, is to utilize the buttons, icom, or menu items that represent operators as part of the application program's user interface. The user moves the wiper icon to, say, a button to attach the operator represented by the button to the wiper.

To better understand how the user's wiping actions can influence the displayed objects, it would be helpful to describe in more detail the several kinds of events that drive the wiping algorithms used in the invention to implement various features described above. These events are initiated by physical actions of the user and are detected, as described above, by hardware and software. The events will be described as effected by a user with a pen in the preferred embodiment, or with a mouse connected in the usual way to the system. The latter would allow the user to manipulate the objects on the whiteboard while seated at a desk or table. The left column indicates the wiper event in boldface, and the right column explains what the user can do, as one example, to implement the command.

| | |
|---|---|
| Enter Wipe Mode | User signals that he wants to enter Wipe mode. This can be done several ways, such as by pushing a "Wipe Mode" button. |
| Exit Wipe Mode | User signals he wants to leave Wipe mode and go to another mode, say by pushing a "Draw" button. |

-continued

| | |
|---|---|
| Set Wiper Operator | User touches a button or icon denoting an operator that can be applied by the wiper. |
| Set Wiper Property | User touches a button or selects from a menu a setting for one of the properties of the Wiper. |
| Wiper Down | User manipulates the input device to signal that the Wiper is "in contact" with the display. With a pen device, this can be done by touching the display surface with the pen. With a mouse, it might be signalled by holding down a mouse button. |
| Wiper Up | User manipulates the input device to signal that the Wiper is "out of contact" with the display. With a pen device, this is done by lifting the pen from the display surface. With a mouse, it might be signalled by releasing the mouse button. |
| Wiper Move | User manipulates the input device to signal that the Wiper has moved to a new location on the display. (The system samples the location of the input device at frequent intervals and infers a move every time the location changes.) With a pen device, this is done by sliding the pen on the display surface while maintaining contact with the surface. With a mouse, this is done by sliding the mouse on the desk while holding the button down. |
| Wipe Path Reversal | User moves the input device in a direction that reverses its previous direction. A software algorithm can be used to detect this. |

These events can be used to partition time into several different scopes:

| | |
|---|---|
| Wipe Session Scope | From Enter to Exit. |
| Wipe Operation Scope | From Enter to the first SetOperator or from SetOperator to the next SetOperator or from SetOperator to Exit. |
| Wipe Stroke Scope | From Down to the next Up. |
| Wipe Segment Scope | From Down to the first Move or from Move to the next Move or from Move to Up. |
| Wipe Branch Scope | From Down to first Reversal or from Reversal to the next Reversal or from Reversal to Up. |

These scopes not only occupy time intervals, they also generate wiping objects.

The most primitive object is a wipe stroke Segment. It is a short line defined by its two end points, which are determined by two locations of the wiper. The wiper is preferably not a dimensionless point, but a solid 2D shape. Therefore, a segment is not just an idealized line with no thickness, but rather is a 2D shape defined by sliding the wiper along the idealized line.

Figure 3:
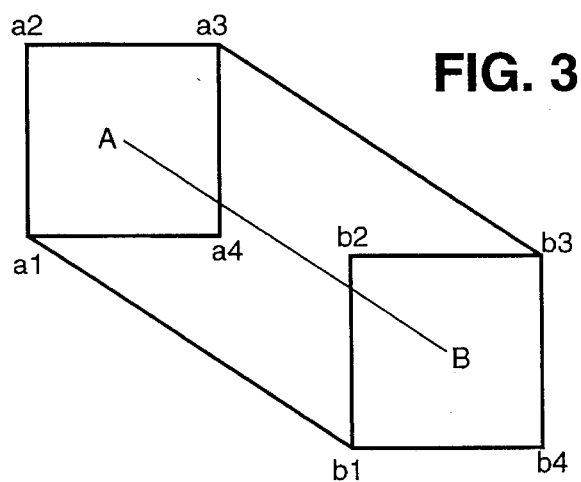
FIG. 3 is illustrates one form (a rectangle) of wiper applicator object in motion from A to B.
Figure 5C:
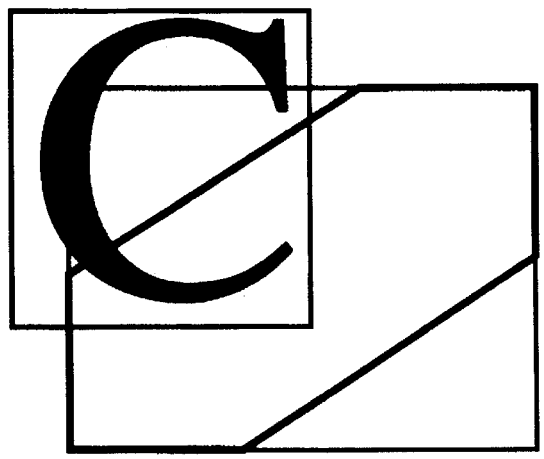
FIG. 5A–5G are sketches illustrating the derivation of one form of target detection algorithm for implementing the invention.
Figure 5A:
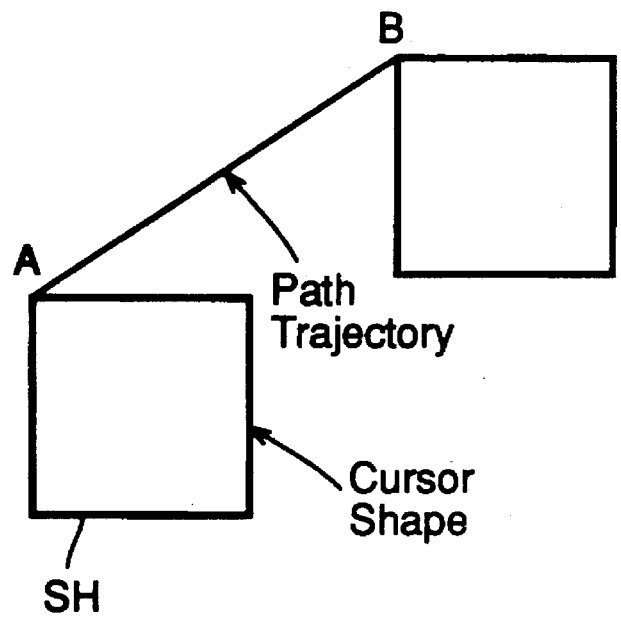
Figure 5B:
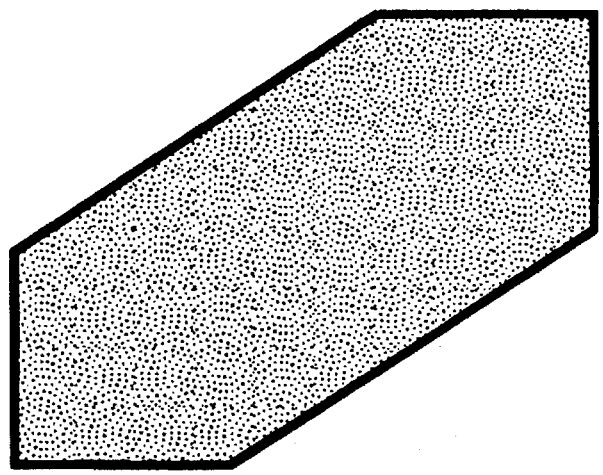
Figure 5D:
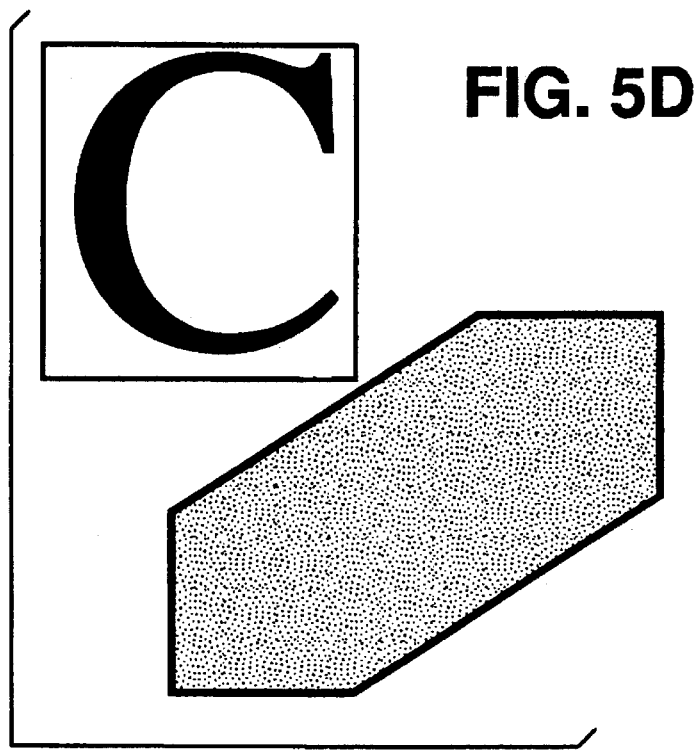

FIG. 3 gives an example. When the wiper is in the shape of a rectangle, a wipe Segment is in the shape of a hexagon, as can be seen in FIG. 5B. The wiper starts at idealized location A and then is detected at idealized location B. This Move event defines an idealized segment [A,B]. When at A, however, the wiper really covers the rectangular area [a1, a2,a3,a4]. Similarly, at B it covers [b1n,b2,b3,b4]. Thus the wipe segment covers the hexagonal area [a1,a2,a3,b3,b4, b1]. Note further that the definition of the hexagon depends on the direction of the move. If B was below and to the left of A, then the segment hexagon would be [a2,a3,a4,b4,b1, b2]. Note that this is just the simplest example of what a Segment is. A Segment may have a Wiper of any shape and size. The Wiper may change orientation as it is moved (e.g., to keep its orientation in line with the path vector). The Wiper could change properties as it is moved (e.g., the Wiper could change size or the Wiper's Operation could change definition in response to a pressure sensitive input device). Finally, the Wipe Segment path does not necessarily have to be straight; it could be a curve (e.g., a Bezier curve that smoothes the motion of a series of moves).

A Wipe Stroke is a sequence of segments. A Stroke's shape is simply the summation (union) of the shapes of all its segments.

A Wiper Operation is a set of Wipe Strokes.

A Wipe Session is a set of Wipe Operations. Note that a default Operator can be set upon Entering Wipe Mode. Thus, if the user never resets the Operator, then the whole Session can consist of just one Operation.

Figure 4A:
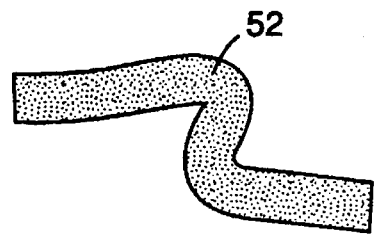
FIGS. 4A and 4B depict, respectively, two wiping strokes, one with and one without reversals or branches.
Figure 4B:
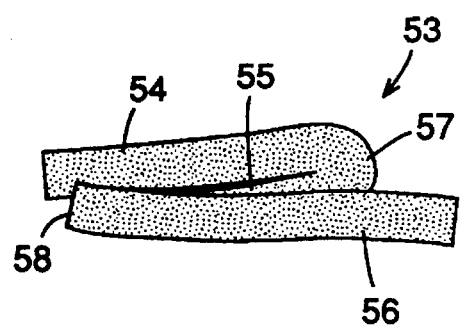

A Wipe Stroke Branch is more complex, because it can perform special functions. First note that a wipe stroke does not necessarily have to contain any branches. The notions of reversals and branches attempts to capture the user's motions of wiping back and forth over (roughly) the same area. A wipe stroke with no reversals would have only one branch. FIG. 4 depicts two possible wipe strokes. The left wipe stroke 52 shown in FIG. 4A has one branch as the stroke proceeds in one direction from left to right. The right one 53, shown in FIG. 4B, in which the user is clearly wiping back and forth, from left to fight 54 to 57, then from fight to left 55 to 58, and finally from left to right again 56, has 3 branches 54–57, 55–58, and 56 and 2 reversals 57, 58. When there are reversals in the wipe stoke, then additional branches are defined. Each branch is a sub-sequence of segments. A reversal is readily detected by a reversal detection algorithm (described in more detail below) which simply tracks the coordinates of the wipe stroke and interprets a coordinate reversal as a branch.

The purpose of the wiping technique is to select target objects on the display (we call them target objects to distinguish them from wiping objects, such as the wipe strokes). The basic "engine" of the wiping technique is to determine what target objects are selected by a wipe segment. The list of selected target objects is called the Segment List.

The Segment List is calculated by a straightforward segment selection algorithm. The algorithm tests each target object on the display for whether its display area overlaps the area of the segment (this is done by a geometric computation on the shape and position of the target object and that of the segment). Whether a target object is selected is determined by the selection criterion. The simplest criterion is that the target object has a non-zero overlap with the segment. More complex selection criteria, as explained above, can be employed.

A Branch List is the aggregation of constituent Segment Lists. A Stroke List is the aggregation of constituent Branch Lists. An Operation List is the aggregation of Stroke Lists. And a Session List is the aggregation of Operation Lists.

These lists are accumulated dynamically and stored by the computer as the user performs physical wiping actions. The smallest unit of accumulation is the Segment List. However, only the new target objects in the Segment List are of use. But "new" can be relative to different things. It could be new relative to the Stroke List. Objects in the Segment List that are already in the Stroke List are "old." We want to reduce the Segment List by taking out the objects that are in the Stroke List. We call the result the Reduced Segment List (relative to the Stroke List). Usually, we want to operate on the objects in the Reduced Segment List. Then we want to add the objects in the reduced segment list to the stroke list.

One example of a suitable wiping algorithm for use in the invention follows below. Comments to explain some of the actions appear the action.

The algorithm uses the following variables:

| | |
|---|---|
| SegList | list of target objects |
| BranchList | list of target objects |
| StrokeList | list of target objects |
| OperationList | list of target objects |
| SessionStrokeList | fist of StrokeLists |
| Operator | name of operator to be applied |
| ApplyAt | name of scope (Segment, Stroke, Operation, or SessionByStroke) at which Operator is to be applied |
| Feedback | name of operator to indicate which target objects were selected (eg: Shadow, Color, etc.) |

| EVENT | ACTIONS |
|---|---|
| Enter | empty OperationList and SessionStrokeList |
| Down | empty BranchList and StrokeList |
| | execute actions for a zero-length Move event |
| Move | calculate new SegList (using Segment Selection Algorithm) if Operator is relative and ApplyAt = Segment: |
| |     reduce SegList by BranchList |
| |     add reduced SegList to BranchList |
| |     apply Feedback to reduced SegList |
| |     apply Operator to reduced SegList |
| | else: |
| |     reduce SegList by StrokeList |
| |     add reduced SegList to StrokeList |
| |     apply Feedback to reduced SegList |
| |     if ApplyAt = Segment |
| |         apply Operator to reduced SegList |
| | if this move is a Reversal: (using Reversal Detection Algorithm) |
| |     empty BranchList |
| Up | execute actions for Move event |
| | put copy of StrokeList onto SessionStrokeList |
| | if Apply At=Operation: |
| |     apply Operator to StrokeList |
| | reduce StrokeList by OperationList |
| | add reduced StrokeList to OperationList |
| Operator | set Operator to name of designated operator |
| | if ApplyAt = Operation: |
| |     apply Operator to OperationList |
| | empty OperationList |
| Property | set appropriate property of Wiper |
| Exit | if ApplyAt = Operation |
| |     apply Operator to OperationList |
| | if ApplyAt = SessionByStroke: |
| |     apply Operator to SessionStrokeList |

An example follows below of how to detect the reversal of direction in a wipe stroke. It tests only for horizontal reversals, which is the easiest way to reverse direction with arm movements on a large, vertical (whiteboard-size) surface. Thus it only considers the horizontal components (the X components) of wipe stroke segments. The four variables below characterize the state of the wipe stroke as it is being created:

fwdX distance moved forward in X direction revX distance moved in reverse of forward X direction newX length and X direction of newest segment T threshold distance for establishing a direction (forward or reverse)

These variables keep track of a sense of forward (fwdX) and reverse (revX) direction in the wipe stroke. In order to filter out movement "noise", a threshold (T), is used to make sure the reversal has gone far enough to qualify as a genuine reversal of direction. When a wipe stroke is started (with a Down event), fwdX is initialized to 0. On each Move event, newX is set to the X distance of the current move stroke segment. Then the following tests are performed to detect if a reversal has taken place (TRUE means there is a reversal and FALSE means there isn't a reversal):

```
if newX=0                    //no movement in X direction
then    return FALSE         //do nothing
if abs(fwdX) < T and         //forward direction not yet
                               established
        newX*fwdX<=0         //movement is nil or in opposite X
                               direction
then    fwdX=newX            //begin in new direction
        revX=0
        return FALSE
if newX*fwdX> 0              //movement is in same X direction
then    fwdX=fwdX + newX
        revX=0
        return FALSE
If newX*fwdX<0               //movement is in opposite X
                               direction
then    revX=revX + newX     //cumulate reversal distance
if abs (revX) < T            //reversal distance less than
                               threshold
then    return FALSE         //not enough to count as a reversal
else                         //reversal reaches threshold
        fwdX=revX            //change forward direction
        revX=0
        return TRUE
```

Those skilled in the art will recognize that the invention is not limited to the use of the specific algorithm described above, and other algorithms can readily be devised to implement the wiping action described herein. The fundamentals are simple. Determine which target objects are selected by testing against the wipe object and the currently active selection criteria. Implement the wiping action by modifying the relevant data structures representing the selected target objects. For example, if the operator is delete, remove the object's data structure from the object list; if the operator is makered, change the color attribute to red; if the operator is shrink, recompute the coordinates of the elements of the objects, and so forth.

There now follows a more rigorous description for finding an efficient way to determine which objects the stylus is touching at any time. We think of the user as specifying a path, which touches some objects and avoids others. Which objects are on the path? At the lowest level, a user's wipe action appears as a series of events. Most of these tell us of a new location to which the stylus has been moved. Since we have no more information, we represent a wipe "path" as the projection of the "applicator" cursor along a series of straight segments. These segments can be quite short. Since both the applicator cursor and the objects it is crossing can have substantial widths, it will often happen that several consecutive segments in a path touch the same object. We generally do not want to apply a given operation to an object more than once during a given stroke.

Referring to FIG. 5, given a set of objects, O, a cursor shape, SH, (FIG. 5A) and a pair of points A and B (which identify a segment), which of the objects is touched by the wipe segment that results from projecting SH along AB. To simplify, we entertain only rectangular cursors whose edges are parallel to the x and y axes. Henceforth, when we use the term "rectangle", we shall mean such a rectangle. And we only consider two types of objects, namely Characters and Strokes.

The path segment that results from projecting [the rectangle] SH along AB is a particular kind of hexagon, four of whose sides are parallel to the x and y axes. Henceforth, when we use the term "hexagon," we shall mean such an object. Note that such a hexagon come in two classes. One can be seen as running from the top/right to the bottom/left, the other from top/left to the bottom/fight. In the first case we will call it a NESW-hexagon, and in the second a NWSE-hexagon. (A perfectly horizontal or vertical trajectory produces the degenerate case of another [larger in one dimension] rectangle.)

Figure 5E:
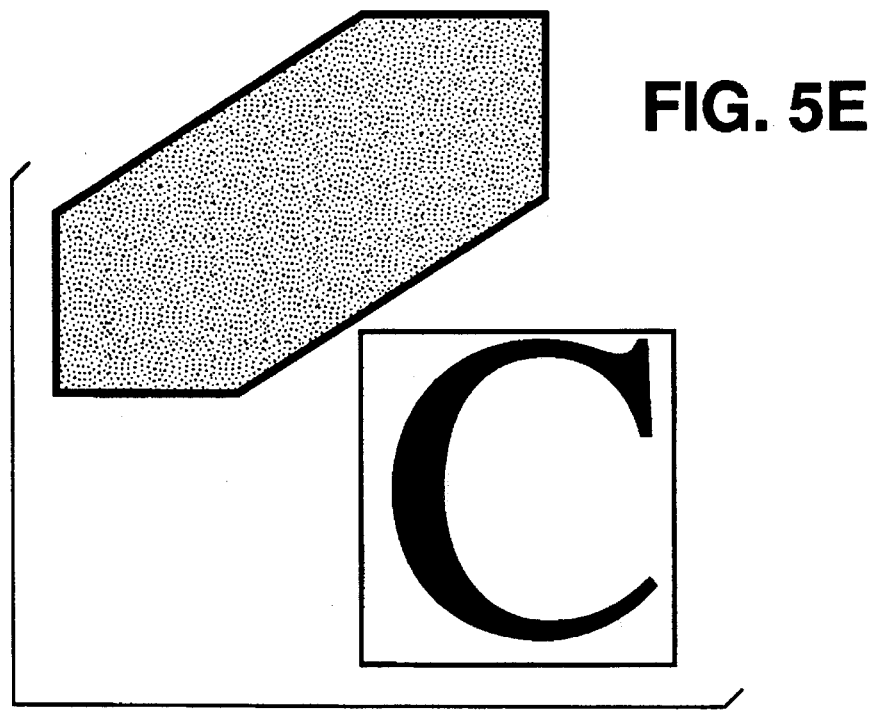
Figure 5F:
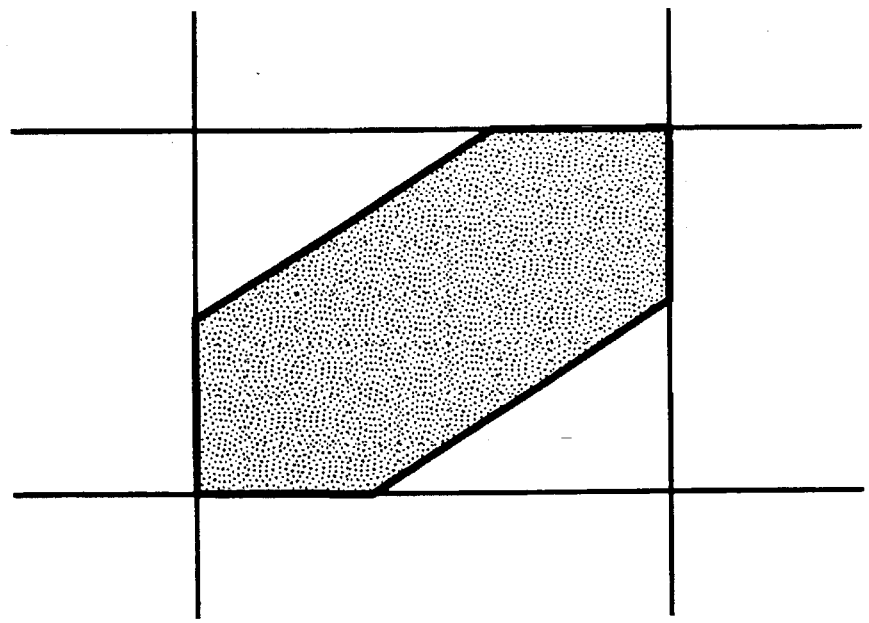
Figure 5G:
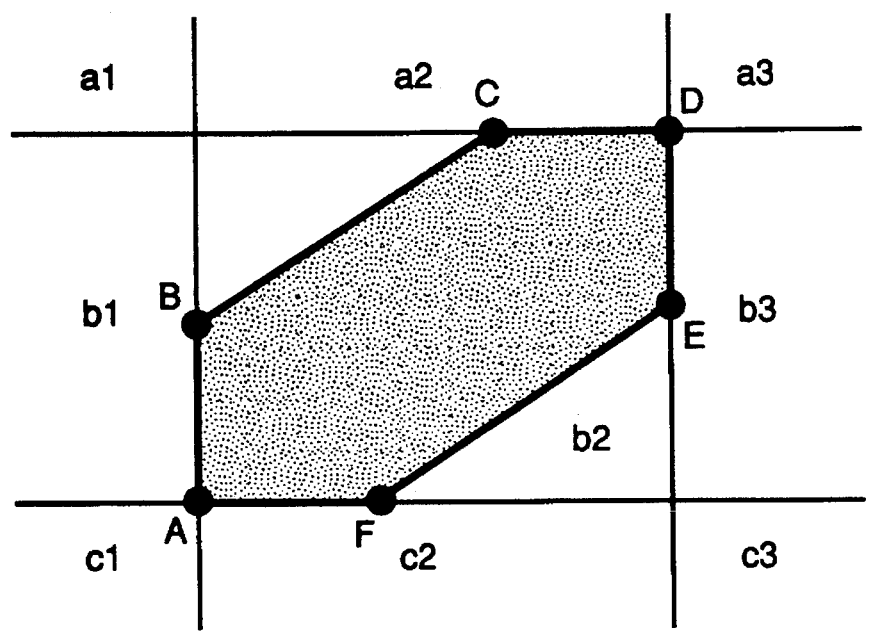

Consider Characters first. We will say that a wipe segment intersects a character if it intersects the character's "bounding box," the smallest rectangle that includes the character. So the question becomes whether a certain hexagon intersects a certain rectangle. See FIG. 5C. Let's look at the case of a NESW-hexagon. A hexagon itself has a bounding box, determined by its two most distant points. Since the hexagon is within its bounding box, it cannot intersect the character unless the two bounding boxes intersect. So we check that first. Rectangle intersection is trivial. But intersection of the respective bounding boxes is not sufficient to insure that the hexagon intersects the character's bounding box. In the case of the NESW-hexagon, we could miss in either of two ways: either if the bounding box's bottom-right corner is "above" the hexagon's top "diagonal" (FIG. 5D), or if the bounding box's top-left corner is "below" the hexagon's bottom "diagonal". (FIG. 5E). These are simple enough computations. It is trivial to find the y-coordinate of any point on a line given its x-coordinate. So, to check for the first false positive (the "above" case), we ask for the point on the top diagonal that has the same x value as the right edge of the character's bounding box. If the bottom of the box is less than this y value, then we have a false positive. We make a similar check for the "below" false positive. So our character-segment intersection decision procedure looks like:

charBB=boundingBox (character)

hexBB=boundingBox (hexagon)

if (not intersect (charBB, hexBB)) return FALSE if (bottom (charBB)<yAtX(rightEdge (charBB), topDiagonal (hexagon))) return FALSE if (top(charBB)>yAtx(leftEdge (charBB), bottomDiagonal (hexagon)) return FALSE return TRUE Now we want to consider how to tell whether a wipe segment hexagon intersects an arbitrary "Stroke". A stroke consists of some number of continuous line segments, all of the same width. Clearly, a stroke will intersect a hexagon just in case at least one of its segments does. So it is sufficient to just run through the segments, asking for each whether it intersects the hexagon. There is one easily overlooked detail. We must be careful to account not only for the width of the hexagon, but also for the (possibly large) width of the stroke. Since we said at the beginning that we would like the stroke to be erased as soon as the user "touches" it with the eraser, it will not do to wait until the cursor hits the "middle" of the stroke. But this represents a fairly difficult computation. We choose to come very close to solving it at a much reduced computational price. Instead of deciding whether a fat line intersects a fat hexagon, we choose to decide whether a very skinny line intersects an extra fat hexagon. That is, we extend the hexagon by the width of the line. In all but very rare cases, this will give nearly the same result. So, our high-level decision procedure for the stroke-hexagon intersection problem looks like:

strokeBB=boundingBox (stroke)

hex=extend(hexagon, width(stroke))

hexBB=boundingBox (hex)

if (not intersect (strokeBB, hexBB))/* bBox check for easy ones */ return FALSE for (i=1; i=numberOfSegments(stroke),++i) if (intersectSegAndHex (strokeSegment) (i, stroke), hex)) return TRUE return FALSE It remains only to give an algorithm for intersectSegAndHex( ), i.e. to explain how to decide whether a segment intersects a hexagon. There are, no doubt, many approaches to this problem. We present here one example which we implemented. The arbitrary hexagon can be said to partition the plane into nine regions (like a huge tic-tac-toe game whose center square is the bounding box of the hexagon). See FIG. 5F. Let's call these nine regions "nonants" (by analogy with "quadrants"). Now, for any stroke segment, we can decide which of these nonants its endpoints lie in. (Say, arbitrarily, that lines are always in, i.e. that ambiguity is always decided in favor of the nonant nearest the center.) For ease of reference, let us label the nonants and the vertices of the hexagon as shown in FIG. 5G. Given the two nonants between which a segment runs, the intersection question may already be decided. For example, a segment running from b1 to b3 must intersect the hexagon, and one running from a1 to c1 cannot.

But there are plenty (23 to be fairly precise) more complicated cases. For example, the question of the intersection with a segment between b1 and c2 will turn on the same son of "above/below" question we encountered in the character case, namely, is point A below the segment. Let us enumerate the interesting nonant pairs. Grouped by identity of decision procedure and ordered more or less in order of increasing complexity, they are Group 1: (a1,b3), (a2,b3), (a2,c3)

Group 2: (a1,c2), (c3,b1), (c2,b1)

Group 3: (a1,c3)

Group 4: (a3,b1),(a3,b1)

Group 5: (a3,c2), (b3,c2),(b3,c1)

Group 6: (a3,c1)

UnGroupX: (b2, anything)

Let's take them in order. Our procedure for Group 1 will return True just in case point D is above the segment. That for Group 2 will return True if and only if point A is below the segment. Our procedure for Group 3 will return True just in case both point D is above the segment and point A is below it. That for Group 4 will return True if either point B or point C is above the segment. That for Group 5 will return True if either point E or point F is below the segment. A segment in Group 6 will intersect the hexagon if at least one of the points B and C is above it and at least one of the points E and F is below it.

And this brings us to the remaining nine cases, which we have labeled UnGroupX. First, assume that only one of the endpoints is in b2. If that point is inside the hexagon, then clearly, the segment intersects the hexagon. Otherwise, the decision criteria will depend on whether the b2-resident endpoint is "above" or "below" the hexagon. We will describe only the "above" case, since the "below" case is completely symmetrical. There are eight possible locations of the other endpoint (one for each of the nonants besides b2.) Let us break them into groups again.

GroupXa1: a1

GroupXa2: b3,c3,c2

GroupXa3: a2,a3

GroupXa4: b1, c1

Group Xa1 must simply return False. GroupXa2 can simply return True.

GroupXa3 should return True if and only if point C is above the segment. And GroupXa4 should return True just in case point B is above the segment.

Finally, a segment both of whose endpoints are in b2 intersects the hexagon if and only if either at least one endpoint is inside the hexagon or both one endpoint is above it and the other is below it.

Here, then, is an only slightly abstracted rendition of the segment-hexagon intersection decision procedure:

if (segment is entirely above, below, left, or right of b2) return FALSE decide the nonant of both endpoints and see which group we're in if (Group1) return pointAbove (D, segment)

if (Group2) return pointBelow (A, segment)

if ( Group3) return pointAbove (D, segment) && pointBelow (A, segment)

if (Group4) return pointAbove (B, segment)¦¦pointAbove (C, segment)

if (Group5) return pointBelow (E, segment)¦¦pointBelow (F, segment)

if (Group6) return (pointAbove(B,segment)¦¦pointAbove (C, segment)) && (pointBelow (E, segment)¦¦pointBelow (F, segment))

return decideUngroupX (segment, hexagon)

And the algorithm for decideUngroupX( ) is:

if (a b2 endpoint is both below BC and above EF)/ *inside hexagon*/ return TRUE if (both endpoints are inside b2) return pointAbove (oneEndpoint, BC) && (pointBelow(theOther, EF)

if (the b2 endpoint is above BC) decide the nonant of the non-b2 endpoint & decide the group if (GroupXa1) return FALSE if (GroupXa2) return TRUE if (GroupXa3) return pointAbove (C, segment)

if (GroupXa4) return pointAbove (B, segment)

else/* the b2 endpoint is below EF*/ decide the nonant of the non-b2 endpoint & decide the group if (GroupXb1 )/* c3 */ return FALSE if (GroupXb2)/* a1,a2, or b1*/ return TRUE if (GroupXb3)/*a3 or b3*/ return pointBelow (E, segment)

if Group Xb4)/*c2 or c1*/ return pointBelow (F, segment)

We have illustrated and outlined the algorithms and decision procedures only for dealing with NESW-hexagons. Algorithms for dealing with NWSE-hexagons are entirely symmetrical. Algorithms for dealing with the rectangles that result from vertical or horizontal wipe trajectories are generally similar, with certain simplifications and specializations for dealing with vertical line segments (where division by zero is a danger.)

The concept of selection criteria of target objects for wiping action can be expanded to include a time aspect. This will be better understood from the following generalized discussion of graphical user interfaces for object-based representations.

In graphical user interfaces to programs that work on object-based representations, there is a general user interface issue of how the user can select objects to operate on. Most graphical user interfaces provide spatial techniques for selecting objects. The user sweeps across the display to define a rectangle or draws a freehand loop. The rectangle or loop defines a spatial region of the display; the program computes which objects are contained in the region; and these are selected objects.

The containment calculation needs to know how much of an object's area or extent needs to be properly contained within the region in order to be selected. In practice, programs are able to set useful and workable thresholds for the amount of containment, and so this is a manageable problem.

Because these techniques select every object within the region and do not select any objects outside the region, we call these pure spatial closure techniques. Wiping so far as described is also a pure spatial closure technique, since selection is determined by containment within a spatial region called the wipe path region.

Closure can be modified by groupings (or other higher level structures over the objects). If subsets of displayed objects are contained in groups (the groupings not necessarily being visibly represented), then one may want to treat the groups as wholes for the purposes of selection. That is, either all of the objects in a group are selected or none are. For example, if a group contains five objects and three are selected by pure spatial closure, then all five are selected. This can be seen as a modification of pure spatial closure. On the other hand, if the group is considered an object, then it is still seen as pure spatial closure, where the containment criterion for groups is somewhat different from the criterion for objects.

In this case the groups must be pre-specified and explicit. Sometimes the groupings are implicit, and further, the groupings can be different at different times and for different purposes.

The selection criteria of this aspect of the invention as applied to wiping addresses the common situation where the objects are produced by the user in a temporal stream. In a drawing program the user creates objects and then sequenctly has to select the objects to edit them. A more specific example is a drawing program that allows the user to draw strokes on the display with a pen-like input device. Strokes are the objects, and they are produced in a stream. Further, it is an empirical fact that there is a spatial orderliness to the way people draw (i.e. they typically do not produce strokes in random locations on the display). This suggests that temporal sequence is a clue to implicit grouping of objects that might make coherent selection that will capture the user's intentions.

Consider an example. The user creates five objects in order: A,B,C,D,E. These are in a spatial cluster, with object C on the edge of the spatial cluster. Later, the user intends to select the five objects but in effecting a sweeping action through the five, fails to intersect object C. By pure spatial closure only four objects are selected. However, the program can use the temporal production sequence as heuristic to decide to also include object C and thus select all five objects.

Given a set of objects in a temporal sequence (or with real-time stamps), a temporal interval that encompasses all those objects can be calculated. If all objects produced within the time interval can be found and they are included in the set, then this is called pure time closure.

However, pure time closure by itself is not a reliable clue to groupings that are meaningful to the user. People often go off on a "side track." For example, a user might produce A and B, then notice something to be corrected in another part of the drawing and produce C, then return to where A and B are and continue by producing D and E. In this case, C is not to be naturally grouped with A,B,D and E. The clue for this is that C is spatially separated from the objects. Thus, a combined time-space closure in accordance with this aspect of the invention needs to be calculated in order to produce reliable groupings that match user intent.

Thus, combining space and time criteria is useful in a variety of circumstances. Below are listed five cases showing examples of algorithms for different situations. given after the five cases.

The following notation and definitions are used. The computer-based system consists of a collection of graphical objects. Each object has a location on the display. S indicates a spatial region on display. The region can be defined by a user in many different ways (e.g., a drawing a loop or lasso, sweeping out a rectangle, a wipe stroke, or even just touching a point). C(S) indicates the spatial closure of S, i.e., the set of objects on the display selected by S, according to some selection criterion(e.g., that the objects are all located within S).

Each graphical object has a time associated with it. The time can be the time of creation, the time of last modification, the time of the last reference, etc., such times are usually kept on a history list. But for our purposes here, we will simply say that the appropriate time is associated with each object as a property of the object. Analogous to S, T indicates a temporal region (i.e., a time interval). C(T) indicates the temporal closure of T,i.e., the set objects whose associated items are in T.

CASE 1: TIME INTERPOLATION OF SPATIAL SELECTION

This algorithm is useful in a situation where, e.g., a wipe selection is made, but where some intended objects were just missed by the wipe stroke.

1. S is given by some user action.
2. Calculate C(S). Set selection to C(S).
3. Calculate the smallest time interval, T, that includes selection.
4. Calculate C(T).
5. For each object in C(T) that is not in selection but is spatially near selection (according to the Spatial Nearness Test),add it to selection.
6. Return selection.

CASE 2: TIME EXTRAPOLATION OF SPATIAL SELECTION

This algorithm is useful in the same situation as Case 1. It can be used rigth after the Case 1 is used.

1. S is given by some user action.
2. Calculate C(S). Set selection to C(S).
3. Find the earliest time, $T_{min}$, of the times associated with the objects in selection.
4. Find the object, O, whose associated time is just before $T_{min}$.
5. If O is temporally near selection (according to the Temporal Nearness Test) and spatially near selection (according to the Spatial Temporal Test), then add O to selection and go back to step 3.
6. Find the latest time, $T_{max}$, of the times associated with the objects in selection.
7. Find the object, O, whose associated time is just after $T_{max}$.
8. If O is temporally near selection (according to the Temporal Nearness Test) and spatially near selection (according to the Spatial Nearness Test), then add O to selection and go back to step 6.
9. Return selection.

CASE 3: TIME CUES FOR PARTIAL SPATIAL INCLUSION

This algorithm is useful in the situation where a loop selection is made and a few objects are only partially selected in the loop (i.e., they are partly in and partly out of the loop). The algorithm decides whether the partially included objects are included or not.

1. S is given by some user action.

2. Calculate C(S). Set selection to C(S).

3. Calculate P(S), the set of objects partially selected by S le.g., those objects only partially enclosed within S).

4. For each object in P(S) that is temporally near selection (according to the Temporal Nearness Test), add it to selection.

5. Return selection.

CASE 4: SPATIAL CHECKING OF EXPANDING TIME SELECTION

This algorithm is useful in doing backing up operations, i.e., operations that undo previous operations in a reverse time order (e.g., "backstroke" erases strokes in the reverse order of their creation). This algorithm provides a stopping criterion for detecting when it is probably inappropriate to continue backing up.

1. An object is given (usually the most recent object created or operated on). Consider it as a singleton set, C(T), in time interval T. Set selection to C(T).

2. Find the earliest time, $T_{min}$, of the times associated with the objects in selection.

3. Find the object, O, whose associated time is just before $T_{min}$.

4. If O is spatially near selection (according to the Spatial Nearness Test), then add O to selection and go back to step 2.

5. Else halt the expansion of selection.

In the previous cases, the process was from a spatial selection to form a collection of objects to modifying the collection using the space-time criterion. Case 4 is an example of an alternative process involving starting with a temporally-determined collection and then modifying it according to the space-time criteria. An example of the alternative is the user specifying the temporally-determined collection by a request for the most recently created objects.

CASE 5: DISENTANGLEMENT OF SPATIAL SELECTION USING TIME

This algorithm is useful in the situation where two groups of objects are spatially entangled, but where the two groups are clustered in time (e.g., a phrase is written producing a group tightly time clustered strokes, then later an annotation on that phrase is written very near the original phrase). If the user tries to spatially select the annotation, it will be difficult to not include a part of the original phrase, since they are spatially entangled.

1. S is given by some user action.

2. Calculate C(S). Set selection to C(S).

3. Sort the objects in selection by their associated times.

4. Calculate the time differences between adjacent objects in the sorted selection.

5. Find the largest time difference, $D_{max}$, between adjacent objects in selection.

6. Divide selection into two subsets $sel_1$, and $sel_2$ at the place where $D_{max}$ occurred in the sorted selection.

7. Ask the user whether, the user wants to select selection, $sel_1$, or $sel_2$.

8. If the answer is $sel_1$ or $sel_2$, then set selection to the answer ($sel_1$ or $sel_2$), and go back to step 5.

9. Else halt the disentangling of selection.

SPATIAL NEARNESS TEST:

This test determines whether it is True that a given object, O, is spatially "near" a given set of objects, selection. There is standard threshold distance, $D_{thresh}$, within which is always considered to be "near" to selection. Otherwise, the nearness is calculated relative to the spatial density of the objects in selection:

calculate D=distance from O to the nearest object in selection if $D<D_{thresh}$, then return True if selection has only one object, then return False temp=copy of selection for each $X_i$ in temp do calculate $M_i$ =the distance from $X_i$ to the nearest object in temp remove $X_i$ from temp calculate A=the average of the $M_i$ calculate S=the standard deviation of the $M_i$ if D<(A +2*S) then return True else return False

TEMPORAL NEARNESS TEST:

This test determines whether it is True that a given object, O, is temporally "near" a given set of objects, selection. There is standard threshold time difference, $D_{thresh}$, within which O is always considered to be temporally "near" to selection. Otherwise, the nearness is calculated relative to the temporal density of the objects in selection:

calculate D=the time difference from O to the nearest object in selection if $D<D_{thresh}$, then return True if selection has only one object, then return False sort selection so the object are in time order for each successive $X_i$ (except the last) in selection do calculate $D_i$ =the time difference between $X_i$ and X+1 calculate A=the average of the $D_i$ calculate S=the standard deviation of the $D_i$ if D<(A+2*S) then return True else return False It will be obvious that the foregoing algorithms which combine both spatial and temporal groupings is likely to produce in many instances the most appropriate grouping of objects, i.e., groupings of objects that are successfully related to each other and that therefore are most likely to conform to the user's intentions. Once the target objects have been so selected, which can readily be established by storing a value in a selected field of its data structure, or storing pointers to the target objects in a list, then the target objects so selected can be operated on in the same manner as described above.

FIG. 2 illustrates some of the benefits using time-space closure to determine the selected target objects. For example, if "ipe" were created within a short time of the creation of "w", it would be assumed they were both part of the same object 47, though physically separated; in contrast, assuming "B" were later in time created, it would not be selected even though the wipe stroke 50 intersects it. The same approach would cause "OK" to be treated as a single object, even though made up of three separate stroke segments.

There has thus been described a novel interface between a user and a computer-controlled display, wherein natural wiping actions of a user can be employed as a way of naturally grouping displayed objects for selection for joint treatment then or at some later time. Since the same wiping or gestural motion can be used to perform a large variety of actions on the selected objects, a consistent but powerful interface technique results. The technique readily lends itself to various filtering schemes to realize user intentions, for example, to filter out objects not within a given or set space or time domain of the applicator. The interface technique described herein is especially useful with whiteboards of the type used for presentations or for its ability to allow hand-sketching of diagrams and the like to exchange ideas with others.

While the invention bas been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A computer-based method for dynamically identifying and operating on objects displayed on a computer-controlled display device by a user manipulating an input device, said displayed objects comprising one or more objects stored as a set of object-based data structures each representative of one of said objects, comprising the steps:

(a) providing means for the user to access an applicator, said applicator being a computer object capable of following a spatial movement having a characteristic shape drawn by the user manipulating the input device, (b) providing computer means to operatively link one of a plurality of operators with said applicator, said operator being capable when applied to a displayed object to influence or modify a property of the whole object, (c) in response to the user's spatial movement with the input device, moving the applicator with operatively-linked operator, independently of which operator is linked to said applicator, along an actual path across a portion of the display, said actual path indicating the characteristic shape made by the spatial movement of the user, said step of moving causing the computer to generate a sequence of wiping segments, each of said wiping segments representing consecutive positions of the actual path followed by the applicator across the display portion, said sequence of wiping segments forming a spatial wiping path for the applicator over said display portion, said computer identifying and storing the position of each of the wiping segments making up the spatial wiping path relative to the positions of the displayed objects, (d) as each segment in the sequence of wiping segments is generated computer-identifying all displayed objects within a predefined distance of the segment on the display whereby, after said objects are identified, the identification of said objects may not be reversed during the formation of said spatial wiping path, said predefined distance being based on user-determined or default criteria, (e) computer-applying said operatively-linked operator only to each of the displayed objects identified in step (d), the application of said operator affecting the whole of each object identified in step (d), the application of said operator to a displayed object modifying the data structure representing the displayed object in a manner visible to the user.

2. The method of claim 1, wherein the wiping path established by step (c) is also stored as an object-based representation.

3. The method of claim 2, wherein the applicator is definable by the user.

4. The method of claim 1, wherein said displayed objects comprise stroke objects drawn by the user.

5. The method of claim 1, wherein the input device is a motion-sensitive input device, and step (a) includes choosing the shape and size of an applicator.

6. The method of claim 1, comprising the step of identifying for the user on the screen the objects in step (e).

7. The method of claim 6, wherein said step of identifying includes graphically highlighting the selected displayed objects.

8. The method of claim 1, wherein step (e) is carried out after all the selected objects have been determined in step (d).

9. The method of claim 1, wherein the user determines the predefined distance of the criteria used in step (d) for identifying all displayed objects within said predefined distance of the wiping path and said predefined distance is localized to a distance proximate the wiping path.

10. A computer-based method for dynamically identifying and operating on objects displayed on a computer-controlled display device by a user manipulating an input device, said displayed objects comprising one or more objects stored as a set of object-based data structures each representative of one of said objects and each containing the position of the object, comprising the steps:

(a) providing means for the user to access an applicator, said applicator being a computer object capable of following the user's motion with the input device, (b) providing computer means to operatively link a user-chosen operator with an applicator, said operator being one of a plurality of operators each capable when applied to a displayed object to influence or modify a property of the whole object, (c) in response to the user's motion with the input device, moving the applicator with operatively-linked operator, independently of which operator is linked to said applicator, along an actual path across a portion of the display to define a spatial wiping path for the applicator over said display portion, said spatial wiping path being determined by generating a plurality of consecutive wipe stroke segments each having two end points determined by spaced consecutive positions of the input device while the applicator is moving along the actual path, said computer storing the position of the spatial wiping path relative to that of the displayed objects, (d) thereafter computer-identifying and storing in a list all displayed objects within a predefined distance on the display of the spatial wiping path established by moving the applicator, whereby, after said objects are identified, the identification of said objects may not be reversed during the formation of said spatial wiping path-said predefined distance being user-determined or determined by default criteria, (e) computer-applying said operatively-linked operator to each of the displayed objects stored in said list established in step (d), the application of said operator affecting the whole of each object in said list and being implemented substantially while the applicator wipes within the predefined distance of each object to define the spatial wiping path, the application of said operator to a displayed object modifying the data structure representing the said displayed object in a manner visible on the display to the user.

11. The method of claim 10, wherein the criteria includes all display objects created within a determined time interval from the creation of any displayed object satisfying the spatial relation criteria.

12. The method of claim 10, wherein the operators include group, delete, fill, color thicken, and undo.

13. The method of claim 10, wherein the abstract operators include undo and tagging.

14. The method of claim 10, wherein the user determined criteria includes a temporal relation between the time when a computer-identified object of step (d) was first displayed and the time when other displayed objects were first displayed.

15. The method of claim 10, wherein the wiping path defines a two-dimensional object.

16. The method of claim 10, wherein step (c) includes physically moving the applicator in a first direction to define a first branch and then in a second direction, different from the first, to define a second branch, further comprising the step of detecting the occurrence of an applicator movement in the second direction.

17. The method of claim 16, wherein the second direction is in reverse of the first direction.

18. The method of claim 17, wherein the carrying out of step (e) is a function of the number of branches established.

19. The method of claim 18, wherein each branch has the effect of further modifying the data structure representing the identified displayed objects.

20. In a graphical drawing and editing system, comprising:

a display device for displaying graphics and text, an input device, computer controlled means connected to the display device and the input device for detecting user actions taken with the input device and for displaying on the display device representations of such actions in the form of graphics and text, the improvement comprising:

said graphics being represented on the display device as a set of displayed objects including stroke objects representing movements of the input device by the user to create the displayed objects, said stroke objects being stored by said computer as a set of objecte-based representations of said displayed objects including the position on the display device of each displayed object, first means connected to the computer controlled means in response to a first user action with the input device for providing a wiping applicator, said applicator being a computer object capable of following the user's motion with the input device, second means connected to the computer controlled means in response to a second user action with the input device for operatively linking one of a plurality of operators with the applicator, said operator being capable when applied to a displayed object to influence or modify a property of the whole displayed object, third means connected to the computer controlled means in response to at least one third user action with the input device simulating a two-dimensional wiping action, independently of which operator is linked to the applicator, for establishing a wiping path over the display for modifying with the operator the object-based representations of those objects displayed on the screen and positioned within a predefined distance on the screen of the wiping path, said third means including means for generating and storing a sequence of wiping segments each representing one of the consecutive portions of the actual movement conforming to the at least one third user action with the input device, said sequence of wiping segments representing said wiping path, said predefined distance being user controlled.

21. The system of claim 20, wherein the third means is effective to modify the object-based representations of all those displayed objects intersected by the wiping path.

22. The system of claim 20, wherein the object-based representations of all those displayed objects having at least a given fraction of its extent intersecting with the wiping path are modified by the said wiping action.

23. The system of claim 20, further comprising means for creating under user control with the input device a wipe stroke segment represented by a two-dimensional solid polygon occupying a corresponding portion of the display area of the display device to constitute the wiping path.

24. The system of claim 23, wherein said third means includes means for determining which displayed objects satisfy a selection criterion which relates the display area occupied by the two-dimensional solid polygon representative of a wipe stroke segment to the display area occupied by a displayed object or to the time when a displayed object was created or modified.

25. A method of operating a system including input circuitry connected to a user input device for producing signals indicating actions of a system user; output circuitry connected to a display having a display area for presenting images; a processor connected for receiving the signals from the input circuitry, and connected for providing images to the output circuitry; and memory for storing data; the data stored in the memory including instruction data indicating instructions the processor executes; the processor being further connected for accessing the data stored in the memory; the method comprising:

(a) operating the processor to receive a plurality of sampled, sequential signals from the user input device indicating image display positions of an applicator display object included in a first image displayed in the display area of the display device; the image display positions indicating and representing the actual movement of the applicator display object by the system user; the movement producing an actual spatial path of motion of the applicator display object in the first image starting with a first one of the plurality of sampled, sequential signals and ending with a last one of the plurality of sampled, sequential signals; each two consecutive sampled, sequential signals of the plurality of signals indicating the actual spatial path of motion being referred to as a signal pair and including first and second sampled, sequential signals; the applicator display object having a shape and a size;

the first image including a plurality of first image display objects; each first image display object being represented by a respective first image object data structure stored in the memory of the system; each respective first image object data structure including first image object position data indicating a first image object display position of the respective first image display object in the first image;

the applicator display object further having a linked operation associated therewith; the linked operation indicating instructions the processor executes for operating on the first image object data structure and;

(b) for each signal pair until the last one of the plurality of sampled, sequential signals is received from the user, when the second sampled, sequential signal of the signal pair is received, operating the processor to respond to the second sampled, sequential signal by:

(i) determining a spatial region area in the first image; the spatial region area including a plurality of image display positions bounded by image display positions of the two consecutive sampled, sequential signals of the signal pair and image display positions in the first image of the spatial path covered by the shape and the size of the applicator display object between the signals of the signal pair;

(ii) using the first image object position data included in each respective first image object data structure, identifying each first image display object as a target display object when an image display position of any portion of a respective one of the first image display objects is within a predefined distance of any one of the plurality of image display positions included in the spatial region area;

(iii) for each identified target display object, applying the linked operation associated with the applicator display object to the respective first image object data structure represented by the target display object to produce a respective modified first image object data structure; and (iv) presenting a second image for display in the display area; the second image including each identified target display object representing the respective modified first image object data structure;

whereby the second image showing the target display objects representing respective modified first image object data structures is presented to the system user substantially contemporaneously with and during the movement of the applicator display object by the system user from the first one to the last one of the plurality of sampled, sequential signals producing the actual spatial path of motion in the first image.

26. A computer-based method for dynamically identifying and operating on objects displayed on a computer-controlled display device by a user manipulating an input device, said displayed objects comprising one or more objects stored as a set of object-based data structures each representative of one of said objects, comprising the steps:

(a) providing means for the user to access an applicator, said applicator being a computer object capable of following the user's motion with the input device, (b) providing computer means to operatively link one of a plurality of operators with an applicator, said operator being capable when applied to a displayed object to influence or modify a property of the whole object, (c) physically moving the applicator with operatively-linked operator, independently of the linked operator, across a portion of the display to define a sequence of wiping segments forming a spatial wiping path for the applicator over said display portion, said computer being capable of identifying and storing the position of each of the wiping segments making up the wiping path relative to the positions of the displayed objects, (d) for each segment in the sequence of wiping segments, when said wiping segment is defined, computer-identifying all displayed objects within a predefined distance on the display of the wiping path established by physically moving the applicator, said predefined distance being based on user-determined or default criteria, (e) computer-applying said operatively-linked operator only to each of the displayed objects identified in step (d), the application of said operator affecting the whole of each object identified in step (d), the application of said operator to a displayed object modifying the data structure representing the said displayed object in a manner visible to the user, said steps being carried out during a wipe session with the computer involving physically moving the applicator without or with a sudden reversal of the applicator movement, said user-determined criteria of step (d) applying step (e) only to those objects computer-identified during the wipe session without or with a sudden reversal of the applicator movement.

27. The method of claim 26 wherein the operator includes one of the following: deleting, cutting, copying, selecting, grouping, tagging, changing object properties, undoing.

* * * * *